Patented July 8, 1941

2,248,283

UNITED STATES PATENT OFFICE 2,248,283

PARA-AMINO-PARA'-HYDROXY DIPHENYL SULPHONE AND DERIVATIVES

George W. Raiziss and Le Roy W. Clemence, Philadelphia, Pa., assignors to Abbott Laboratories, North Chicago, Ill., a corporation of Illinois No Drawing. Application July 7, 1938, Serial No. 217,964

6 Claims. (Cl. 260—397.6)

The present invention relates to p-amino-p'-hydroxy diphenyl sulphone and derivatives of the same.

The products of the present invention have high therapeutic properties and are particularly adapted for use in combatting streptococcic infections. The basic product of the present invention, i. e. p-amino-p'-hydroxy diphenyl sulphone, possesses surprisingly high therapeutic properties and opens up a new field of preparations in which various substitutions may be readily made in either the amino group or the hydroxy group or both groups simultaneously as desired. The various derivatives of the amino, hydroxy diphenyl sulphone are also active therapeutic agents.

The following examples including methods of preparation will serve to illustrate the present invention:

EXAMPLE I

*p-Amino-p'-hydroxy diphenyl sulphone*

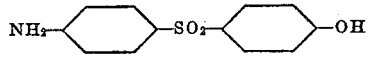

About 5.8 grams of p-acetylamino-p'-amino diphenyl sulphone are suspended in 48 cc. of a 10 percent sulphuric acid solution, cooled to 0° C. and diazotized in the usual manner by the addition of 1.4 grams of sodium nitrite dissolved in 10 cc. of water. The diazotization is completed by rapidly stirring the solution for about 15 minutes. The entire mixture is then added to a boiling solution of 32 cc. of concentrated sulphuric acid dissolved in 64 cc. of water. The boiling is continued for about one hour when nitrogen is evolved. The solution is then cooled to room temperature and sodium carbonate added until slightly alkaline. The precipitate formed is filtered off and thoroughly washed with water. To purify, dissolve at room temperature with vigorous agitation 5 grams of precipitate in 100 cc. of water containing 0.9 grams of NaOH. Filter off any undissolved material and add dilute HCl to clear filtrate until faintly acid to litmus. The product precipitates as a white solid and after several recrystallizations from hot water has a melting point of about 192° C. This product p-amino-p'-hydroxy diphenyl sulphone, is soluble in boiling water, dilute alkali, ethyl alcohol and acetone, slightly soluble in ether and practically insoluble in cold water.

EXAMPLE II

*p-Acetylamino-p'-hydroxy diphenyl sulphone*

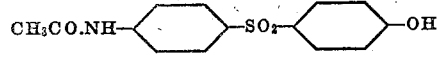

About 2.5 grams of p-amino-p'-hydroxy diphenyl sulphone are suspended in 25 cc. of water and 2.5 cc. of acetic anhydride gradually added with stirring. At first a gummy material forms which gradually hardens and breaks up into a white crystalline precipitate. This product p-acetylamino-p'-hydroxy diphenyl sulphone, is recovered by filtration and is recrystallized from a mixture of alcohol and water in the usual manner.

EXAMPLE III

*p-Propionylamino-p'-hydroxy diphenyl sulphone*

About 2.5 grams of p-amino-p'-hydroxy diphenyl sulphone are suspended in 25 cc. of water and 2.5 cc. of propionic anhydride added in portions with stirring. An oily layer settles to bottom of the beaker which on standing gradually hardens to crystalline solid. This product p-proprionylamino-p'-hydroxy diphenyl sulphone, is recovered by filtration and is recrystallized from a mixture of alcohol and water.

EXAMPLE IV

*p-Butyrylamino-p'-hydroxy diphenyl sulphone*

About 2.5 grams of p-amino-p'-hydroxy diphenyl sulphone are suspended in 25 cc. of water and 3 cc. of butyric anhydride added in portions with stirring. An oily layer settles to bottom of beaker which on standing gradually hardens to a crystalline solid. The precipitate p-butyrylamino-p'-hydroxy diphenyl sulphone is purified by recrystallizing several times from a 50 percent alcohol solution.

EXAMPLE V

*p-Chloroacetylamino-p'-hydroxy diphenyl sulphone*

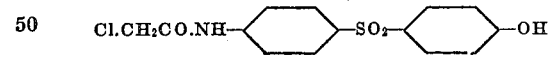

About 10 grams of p-amino-p'-hydroxy diphenyl sulphone are suspended in 30 cc. of water and 5 cc. of chloroacetyl chloride are added slowly with stirring. A gummy material separates which on continued stirring gradually hardens to crystalline solid. The precipitate p-chloroacetyl-amino-p'-hydroxy diphenyl sulphone is washed with water and recrystallized from a 60 percent alcohol solution.

Example VI

*p-Succinyl amino-p'-hydroxy diphenyl sulphone*

About 5 grams of p-amino-p'-hydroxy diphenyl sulphone are dissolved in 25 cc. of acetone and 2 grams of succinic anhydride added thereto. The mixture is allowed to stand overnight and then evaporated to dryness in vacuo. The product obtained is purified by two recrystallizations from boiling water.

Example VII

*Sodium salt of p-succinylamino-p'-hydroxy diphenyl sulphone*

About 10.5 grams of p-succinylamino-p'-hydroxy diphenyl sulphone are suspended in 40 cc. of water and dissolved with stirring by adding 1.6 grams of anhydrous sodium carbonate. This solution is filtered, an equal volume of alcohol added and the resulting solution then poured into 10 volumes of acetone. A gummy substance separates which settles to the bottom. The supernatant liquid is next decanted and the gummy substance treated several times with fresh acetone. The resulting product, a crystalline powder which is soluble in water, should be dried in vacuo in the usual manner.

Example VIII

*p-Phenylacetylamino-p'-hydroxy diphenyl sulphone*

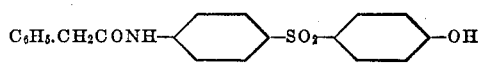

About 5 grams of p-amino-p'-hydroxy diphenyl sulphone are suspended in 25 cc. of water and 3.1 gms. of phenylacetyl chloride added with stirring. The insoluble p-phenyl acylamino p'-hydroxy compound forms a curdy precipitate which gradually crystallizes. The product which is soluble in boiling alcohol should be washed well with water.

Example IX

*p-(n-p-Tolyl-blycyl) amino-p'-hydroxy diphenyl sulphone*

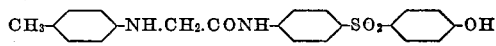

About 3.3 grams of p-chloracetyl amino-p'-hydroxy diphenyl sulphone are suspended in 50 cc. of water and 0.84 gms. of sodium bicarbonate and 1.07 gms. of p-toluidine added. The mixture is heated to boiling under reflux condenser for about 8 hours. The reaction mixture is then cooled and the oily substance formed during the refluxing gradually hardens. The product is separated by filtration and is recrystallized from a mixture of alcohol and water in the usual manner.

Example X

*p-Hydroxybenzene sulphone-p'-phenyl-n-glycine-sodium salt*

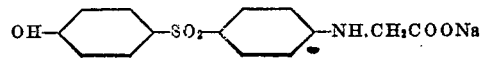

About 2.5 grams of p-hydroxy-p'-amino-diphenyl sulphone are suspended in 50 cc. of water and to this is added 0.92 grams of sodium bicarbonate and 0.94 grams of chloroacetic acid. The mixture is heated under reflux condenser for several hours. An oily substance separates and on further heating gradually goes into solution. After refluxing for a total of about 6 hours the mixture is cooled and the oily substance settles out. The supernatant liquid is decanted and the oily material dissolved in 100 cc. of boiling water. On cooling the product again separates as an oil. To convert the product into the sodium salt the oil is dissolved in 20 cc. of water containing 0.6 grams of sodium carbonate. The salt is soluble in water and may be precipitated by adding the solution to a mixture of 50 cc. of alcohol and 400 cc. of acetone. The precipitated salt may be separated by filtration and should be dried in vacuo in the usual manner.

Example XI

*p-Hydroxybenzene sulphone-p'-phenyl-n-glycineamide*

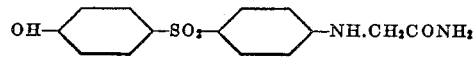

About 2.5 grams of p-amino-p'-hydroxy diphenyl sulphone are suspended in 50 cc. of water and 0.94 gms. of chloracetamide and 0.46 gms. of sodium bicarbonate added. The mixture is refluxed for about ¾ hour. The reaction mixture at first clear, becomes cloudy and an oily, gummy substance separates which hardens somewhat on cooling. The product should be purified by recrystallization from alcohol.

Example XII

*p-Acetamino-p'-acetoxy diphenyl sulphone*

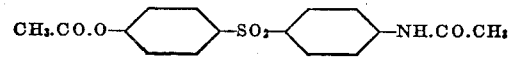

About 10 grams of amino-hydroxy-diphenyl sulphone are mixed with 20 cc. of acetic anhydride and two drops of concentrated $H_2SO_4$ added thereto. The mixture is refluxed for 15 minutes, cooled and then poured into water. Sodium hydroxide is next added until the mixture is alkaline. The precipitate obtained is filtered, washed with water and recrystallized from about 75 percent alcohol solution containing a small amount of charcoal.

Example XIII

*p-(p-Amino-benzenesulphonyl) amino-p'-hydroxy diphenyl sulphone*

About 5 grams of p-amino-p'-hydroxy sulphone and 4.7 grams p-acetamino benzene sulphonyl chloride are dissolved in 30 cc. acetone + 30 cc. of water. To this solution 2 grams of $NaHCO_3$ is added and the mixture allowed to stand about 4 hours. About 4 volumes of water are then added and a gummy substance separates. The supernatant liquid is decanted and the gummy precipitate washed several times with a few hundred cc. of water until the gum hardens to solid. This solid material is then hydrolyzed by boiling with 50 cc. of dilute hydrochloric acid (sp. gr.= 1.08), under reflux condenser for one-half hour. The mixture is then cooled and sodium carbonate added until neutral to litmus. The gummy mass which precipitates is washed by decantation and allowed to stand overnight in water. This product is then dissolved in a mixture of hot alcohol and water from which it precipitates on cooling. The precipitate is next filtered and placed in a desiccator where on drying it forms a hard product.

Example XIV

*Sodium formaldehyde sulphoxylate derivative of p-amino-p'-hydroxy diphenyl sulphone*

About 1.54 grams of finely powdered sodium formaldehyde sulphoxylate are dissolved in 25 cc. of boiling alcohol. To this solution are added 2.5 grams of p-amino-p'-hydroxy diphenyl sulphone and the mixture boiled under a reflux condenser for about 5 hours. The reaction mixture is then cooled with stirring and the precipitate formed separated by filtration and dried in vacuum.

The derivatives of p-amino-p'-hydroxy diphenyl sulphone may be classed in the following groups.

*Group A.*—Compounds in which a hydrogen of the amino group is replaced by an acyl (acidyl) group. Examples II, III, IV and XII. (The hydrogen in the hydroxy group in Example XII also being replaced by an acyl group.)

*Group B.*—Compounds in which a hydrogen of the amino group is replaced by a substituted acyl (acidyl) group. Examples V, VI, VII, VIII, IX and XIII. (The sulphonyl group in Example XIII being an acidyl group.)

*Group C.*—Compounds in which a hydrogen of the amino group is replaced by an alkyl residue, Examples X, XI and XIV.

It will be understood by those skilled in the art that our invention is not limited to the above illustrative examples. All derivatives and substitution products of p-amino-p'-hydroxy diphenyl sulphone of the type described coming within the spirit and scope of the present invention are intended to be covered by the following claims, which are to be interpreted as broadly as the art will permit.

We claim:

1. p-Amino-p'-hydroxy diphenyl sulphone.
2. p-Acetylamino-p'-hydroxy diphenyl sulphone.
3. p-Acetylamino-p'-acetoxy diphenyl sulphone.
4. Products represented by the following formula:

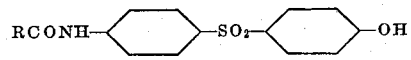

in which R is a lower alkyl group.

5. A p-lower carboxylic acyl amino-p'-hydroxy diphenyl sulphone.
6. A composition of matter having the formula:

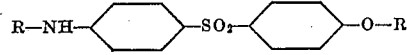

wherein the R's are selected from the group consisting of hydrogen and lower carboxylic acyl groups.

GEORGE W. RAIZISS.
LE ROY W. CLEMENCE.